US012649676B2

(12) United States Patent
Tang et al.

(10) Patent No.: US 12,649,676 B2
(45) Date of Patent: Jun. 9, 2026

(54) SYSTEM AND METHOD FOR CONTINUOUS METABOLISM OF 1,4-DIOXANE

(71) Applicant: The Florida State University Research Foundation, Inc., Tallahassee, FL (US)

(72) Inventors: Youneng Tang, Tallahasse, FL (US); Sarajeen Saima Hoque, Tallahassee, FL (US); Yi Xiong, Tallahassee, FL (US)

(73) Assignee: THE FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 408 days.

(21) Appl. No.: 18/171,575

(22) Filed: Feb. 20, 2023

(65) Prior Publication Data

US 2023/0264995 A1 Aug. 24, 2023

Related U.S. Application Data

(60) Provisional application No. 63/268,289, filed on Feb. 21, 2022.

(51) Int. Cl.
*C02F 3/34* (2023.01)
*C02F 101/30* (2006.01)
*C02F 103/06* (2006.01)

(52) U.S. Cl.
CPC .......... *C02F 3/341* (2013.01); *C02F 2101/30* (2013.01); *C02F 2103/06* (2013.01); *C02F 2203/006* (2013.01)

(58) Field of Classification Search
CPC .......................... C02F 3/341; C02F 2101/366; C02F 2101/30; C02F 2103/06; C02F 2203/006; C02F 2003/001; C02F 3/104
USPC ....................................................... 210/610
See application file for complete search history.

(56) References Cited

U.S. PATENT DOCUMENTS

| | | | |
|---|---|---|---|
| 6,605,216 B1 * | 8/2003 | Lederman ............ | B01D 29/036 |
| | | | 210/269 |
| 2018/0215639 A1 * | 8/2018 | Locke .................... | H05H 1/486 |
| 2019/0224731 A1 * | 7/2019 | Li ............................ | B09C 1/08 |

FOREIGN PATENT DOCUMENTS

| | | | | | |
|---|---|---|---|---|---|
| CA | 3049886 A1 | * | 7/2018 | ............. | B01D 53/02 |
| CN | 111867990 A | * | 10/2020 | ............. | C02F 11/12 |
| JP | 2851296 B2 | * | 1/1999 | | |
| WO | WO-2019163424 A1 | * | 8/2019 | ................ | C02F 3/08 |

OTHER PUBLICATIONS

Magnusson et al., English machine translation CN 111867990, pp. 1-22 (Year: 2020).*

(Continued)

*Primary Examiner* — Claire A Norris
(74) *Attorney, Agent, or Firm* — Eversheds Sutherland (US) LLP

(57) ABSTRACT

Bioreactors and associated methods are provided herein including bioreactors capable of treating water contaminated with 1,4-dioxane. In certain embodiments, a bioreactor is disclosed and may include an adsorbent layer with a biofilm capable of metabolizing 1,4-dioxane and a screen disposed downstream of the adsorbent layer configured to retain detached biofilm.

18 Claims, 5 Drawing Sheets

(56) References Cited

OTHER PUBLICATIONS

Iwatsuka, English machine translation JP 2851296, pp. 1-5 (Year: 1999).*

Kobayashi et al., WO 2019163424. English machine translation, pp. 1-6 (Year: 2019).*

* cited by examiner

SYSTEM AND METHOD FOR CONTINUOUS METABOLISM OF 1,4-DIOXANE

CROSS-REFERENCE TO RELATED APPLICATION

This application claims priority to U.S. Provisional Patent Application No. 63/268,289, filed Feb. 21, 2022, which is incorporated herein by reference.

FIELD OF THE DISCLOSURE

This disclosure relates generally to bioreactors and more particularly to bioreactors loaded with microbes for metabolizing 1,4-dioxane, and methods of treating contaminated water.

BACKGROUND 1,4-Dioxane is a synthetic, non-naturally occurring chemical commonly used in pharmaceutical purification and solvent stabilization, including stabilization of chlorinated hydrocarbons. 1,4-Dioxane, sometimes referred to as 1,4-diethyleneoxide or simply "dioxane," has been linked to liver cancer in rodents and is classified by the United States National Toxicology Program as "reasonably anticipated to be a human carcinogen." Because of its high water solubility, 1,4-dioxane readily dissolves into groundwater and its movement is not retarded significantly by sorption to soil particles. Unfortunately, 1,4-dioxane does not readily biodegrade in the environment and, because it has a very low Henry's Law constant, it is difficult to remove from water through air stripping. Despite recent declines in manufacturing and use, 1,4-dioxane is one of the most widespread contaminants in drinking water.

1,4-Dioxane is typically found at some solvent release sites and polyethylene terephthalate (PET) manufacturing facilities. It is short-lived in the atmosphere due to photo-oxidation, with an estimated half-life of 1 to 3 days. It is relatively resistant to biodegradation in water and soil, although recent studies have identified many degrading bacteria. 1,4-Dioxane is frequently present at sites contaminated with chlorinated organic solvents such as 1,1,1-trichloroethane (TCA). As of 2016, 1,4-dioxane had been identified at more than 34 sites on the EPA National Priorities List (NPL). It may be present (but samples were not analyzed for it) at many other sites. From January 2013 to January 2014, the third Unregulated Contaminant Monitoring Rule (UCMR3) monitored over 5,000 public drinking water supplies in the U.S. and found that 6.9% of the water supplies had 1,4-dioxane at concentrations greater than 0.35 μg/L, which is the reference level corresponding to a cancer risk of 10-6. EPA has classified 1,4-dioxane as "likely to be carcinogenic to humans" by all routes of exposure. Many states also established some drinking-water and groundwater guidelines. For example, California has established a 1 μg/L concentration as the notification level for drinking water. These current standards suggest that the future concentration limit for 1,4-dioxane may be very low (<1 μg/L).

Since 1,4-Dioxane dissolves readily in water, but does not evaporate readily, removal of 1,4-dioxane from water is challenging. Most common groundwater treatment systems, such as aeration and adsorption through activated carbon common in chlorinated solvent removal, have no significant effect on the concentration of 1,4-dioxane in the water. Instead, advanced oxidation and adsorption are currently utilized to remove 1,4-dioxane from water. However, the costs of advanced oxidation and adsorption is much higher than common groundwater treatment methods. While the high cost of advanced oxidation is associated with the high energy intensity, the high cost of adsorption is caused by the cost of new synthesized adsorbents such as AmberSorb™ 560 and/or the need for frequent replacement or regeneration of conventional adsorbents such as granular activated carbon (GAC).

Adsorbents collect and extract material by adsorbing liquids or vapors into pores on their surface. Each pore can have a diameter of between a couple of nanometers to hundreds of nanometers. The purpose of the pores is to not only store the collected molecules but also separate certain molecules by size. The pores on most adsorbents have a depth of only a few molecules and, as a result, can only collect a few molecules per pore. Many pores are therefore necessary in order to absorb increasingly larger amounts of material. Since these pores are on the surface of each adsorbent particle, adsorbent particles with greater surface area will be more effective as an adsorbent.

Biodegradation based on microorganisms has gained a lot of attention in recent years involving the use of bioreactors filled with adsorbent for biofilm attachment. The biofilm oxidizes 1,4-dioxane through metabolic respiration of oxygen ($O_2$) dissolved in water. These bioreactors have been combined with adsorption, eliminating the need to replace adsorbents since the microbes on the adsorbent may continuously degrade the adsorbed 1,4-dioxane. However, previous attempts to use biofilms in combination with adsorbents have been unable to reduce the concentration of 1,4-dioxane close to or less than the health-based reference level of 0.35 μg/L due to the inability to create a self-sustaining colony of microbes capable of metabolizing 1,4-dioxane.

Accordingly, there remains a need for improved means of reducing 1,4-dioxane concentrations in water sources.

BRIEF SUMMARY

In one aspect, a bioreactor system is disclosed, which includes a housing having an inlet and an outlet; at least one adsorbent layer disposed in the housing including a biofilm with microbes capable of metabolizing 1,4-dioxane; and a first screen positioned downstream from the at least one adsorbent layer. The screen is configured to retain within the bioreactor any of the biofilm that becomes detached from the at least one adsorbent layer. The inlet may accept an influent including water contaminated with 1,4-dioxane, and the bioreactor may be configured to be operated in a manner effective to reduce the concentration of 1,4-dioxane in the water to an amount of less than 0.5 μg/L in the effluent.

In another aspect, a method is provided for reducing 1,4-dioxane content in water including: flowing water from a water source contaminated with 1,4-dioxane into a bioreactor system that includes an adsorbent including a biofilm with microbes capable of metabolizing 1,4-dioxane; and collecting treated water that is discharged from the bioreactor system, wherein the treated water has a concentration of 1,4-dioxane that is lower than the concentration of 1,4-dioxane in the water source.

BRIEF DESCRIPTION OF THE DRAWINGS

The detailed description is set forth with respect to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale.

DETAILED DESCRIPTION

Figure 1:
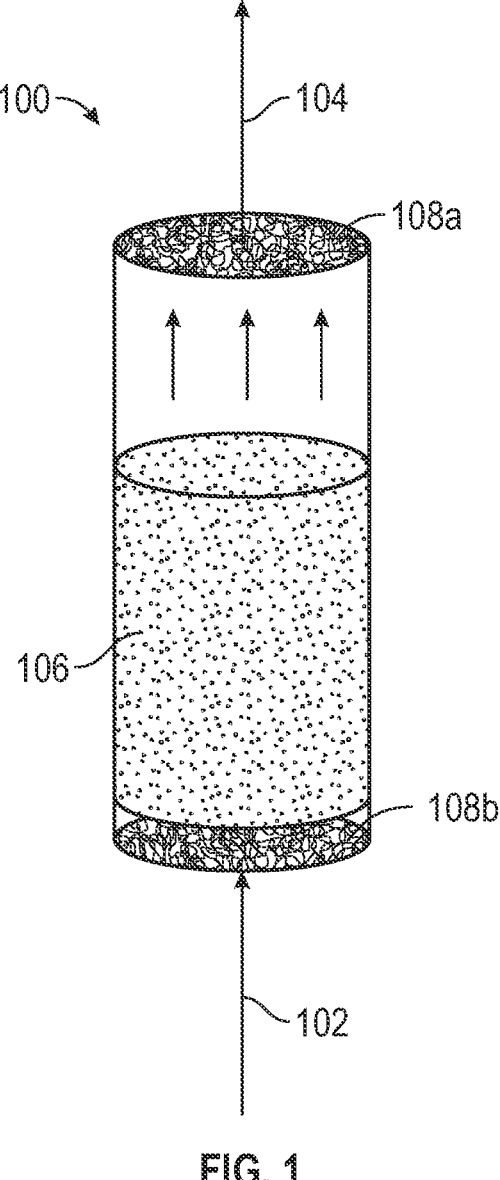
FIG. 1 depicts a bioreactor in accordance with one or more embodiments of the present disclosure.

New and improved bioreactors for reducing 1,4-dioxane concentration in a water source have been developed. In particular, the inability for bioreactors to effectively reduce 1,4-dioxane content in a water source may be remedied by incorporating a screen for retaining detached biofilm. Without intending to be bound by any particular theory, it is believed that the environmentally relevant concentration of 1,4-dioxane in a given water source, although greater than the health-based reference level of 0.35 µg/L, is nonetheless too low to induce/maintain growth of microbes capable of metabolically oxidizing 1,4-dioxane. By incorporating a screen configured to retain the biofilm that naturally detaches from the adsorbent layer in a bioreactor, it has been unexpectedly discovered that the 1,4-dioxane content in a given water source may be effectively reduced.

As used herein, a "water source" refers to any water source contaminated by 1,4-dioxane, such as groundwater, drinking water, wastewater, landfill leachate, and the like. In some embodiments, these terms are used interchangeably. For example, "groundwater" and "drinking water" may refer to the same source of water. In other words, any source of water that is contaminated by 1,4-dioxane may be treated using the bioreactors and methods disclosed herein.

As used herein, a "biofilm" refers to an agglomeration of microbial colonies adhered to a surface such as an adsorbent.

As used herein, the "environmentally relevant" concentration of 1,4-dioxane is on the order of about 0.5 µg/L to about 100 µg/L, such as around 25 µg/L.

As used herein, the "health-based reference level" for 1,4-dioxane refers to the United States Environmental Protection Agency health advisory level, based on a 1-in-10[6] cancer risk, of 0.35 µg/L.

As used herein, an "adsorbent layer" refers to a layer or surface configured to permit growth and/or attachment of a biofilm.

Throughout this disclosure, various aspects may be presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

As used herein, the term "about" with reference to dimensions refers to the dimension plus or minus 10%.

Bioreactors for Reducing 1,4-Dioxane Content in Water

In some embodiments, a bioreactor is provided including at least one adsorbent layer comprising a biofilm (thereon/ therein) and a screen positioned downstream from the at least one adsorbent layer configured to retain detached biofilm ejected from the at least one adsorbent layer. In some embodiments, the biofilm comprises microbes capable of metabolizing 1,4-dioxane. Without intending to be bound by any particular theory, it is believed that a screen designed to "catch" or retain biofilm that detaches or sloughs off the adsorbent layers increases the lifetime of the biofilm itself and improves 1,4-dioxane removal.

In some embodiments, the bioreactor is operated in an up-flow mode. Operating a bioreactor in "up-flow" mode refers to passing contaminated water upward though the filtration means within the bioreactor. In other embodiments, the bio reactor is operated in a down-flow mode.

In some embodiments, the empty bed contact time is between about 30 minutes and about 720 minutes. As used herein, the "empty bed contact time" (EBCT), also called the "empty bed retention time," refers to the amount of time the contaminated water is in contact with the adsorbent. The EBCT depends on the concentration of the contaminant to be removed and the specific surface area of the adsorptive medium. Without intending to be bound by any particular theory, it is believed that the EBCT has a linear, positive correlation with the influent 1,4-dioxane concentration, and a linear, negative correlation with the surface area of the adsorptive medium. Thus, a middle-ground EBCT exists for a given adsorptive medium surface area. It is believed that this medium empty bed retention time is desired for maximizing the efficiency of the 1,4-dioxane removal using a given bioreactor. EBCT may be calculated according to Formula I:

$$EBCT = \frac{\text{Bed Volume (ft}^3) \times 7.48 \text{ Gallons/ft}^3}{\text{Flow Rate (gallons/min)}} \qquad \text{Formula I}$$

Empty Bed Contact Time

In some embodiments, the bioreactor has an influent in the form of water contaminated with 1,4-dioxane. In some embodiments, the concentration of 1,4-dioxane is less than or about 25 µg/L, for example between 0.50 µg/L and 100 µg/L. Without intending to be bound by any particular theory, it is believed that a medium concentration of 1,4-dioxane in the influent, such as around 25 µg/L, contributes to an improved removal of 1,4-dioxane from the influent, and therefore a more successful bioreactor.

In some embodiments, the bioreactor has an effluent in the form of water contaminated with 1,4-dioxane. As a result of the metabolic oxidation of 1,4-dioxane by the microbes in the biofilm within the bioreactor, the effluent has a concentration of 1,4-dioxane of less than 0.5 µg/L or about 0.5 µg/L.

FIG. 1 depicts an exemplary bioreactor 100 in accordance with the present disclosure. Bioreactor 100 is depicted as accepting an influent 102 at a lower position of the bioreactor 100, and discharging an effluent 104 at an upper position of the bioreactor 100. In this way, bioreactor 100 is depicted in an "up-flow" mode. In some embodiments, a bioreactor may accept an influent at an upper position of the bioreactor and discharge an effluent at a lower position of the bioreactor so that the bioreactor is in a "down-flow" mode.

In other embodiments, the bioreactor may be configured for lateral flow of the influent and/or the effluent, such as to accept an influent at a side position of the bioreactor. Any suitable configuration of bioreactor and influent/effluent streams may be used depending on the needs of the application, and the decision to depict only the "up-flow" configuration is in the interest of brevity only and is not intended to be limiting.

Bioreactor 100 includes an adsorbent layer 106. Adsorbent layer 106 includes an adsorbent material and a microbial inoculum. Suitable adsorbent materials include those known in the art. In some embodiments, the adsorbent material is one or more of AmberSorb™ 560, HiSiv 3000, Zeolite HSZ-Alumina, Zeolite HSZ-Clay, and Granular Activated Carbon. In some embodiments, the microbial inoculum, also referred to as a biofilm because it is in the form of a microbial "film" on the surface of the adsorbent particles, includes microbes capable of metabolizing 1,4-dioxane. In some embodiments, the column material 106 is in the form of a fluidized bed of particles of the adsorbent material.

Bioreactor 100 includes screens 108a and 108b. Screen 108a is depicted in FIG. 1 as being positioned downstream from the adsorbent layer 106 and screen 108b is depicted as being positioned upstream from the adsorbent layer 106. The screens are configured to ensure the microbial inoculum remains within the bioreactor and continues to metabolize 1,4-dioxane. Suitable screens are characterized by having a plurality of openings, each opening having a size smaller than the size of the adsorbent particles present within the bioreactor. For example, suitable screens may have a plurality of openings having a size (e.g., diameter, or largest dimension) of at least 0.001 mm.

Methods for Reducing 1,4-dioxane Content in a Water Source

Methods for reducing 1,4-dioxane content in a water source are also disclosed herein. In some embodiments, the method includes providing a bioreactor as disclosed herein. The method may include supplying the water source to the bioreactor as influent and collecting treated water exiting the bioreactor as effluent. In some embodiments, the influent has a first concentration of 1,4-dioxane and the effluent has a second concentration of 1,4-dioxane that is lower than the first concentration.

In another embodiment, a method includes providing a bioreactor as disclosed herein and supplying the bioreactor with contaminated water as the influent. Passing contaminated water through the bioreactor enriches the biofilm with the influent. Without intending to be bound by any particular theory, it is believed that removal of 1,4-dioxane from the contaminated water results in growth of microbes on the biofilm through this "enrichment" process.

In some embodiments, the enriched biofilm is removed from the reactor. The removed enriched biofilm may then be injected into a contaminated water source, which may be the same or another water source as that being treated in the bioreactor. Without intending to be bound by any particular theory, it is believed that the 1,4-dioxane-metabolizing microbes in the enriched biofilm, when injected into a contaminated water source, acts to remediate the contaminated site in-situ through bioaugmentation.

The invention may be further understood with reference to the following non-limiting examples.

Example 1: Bench Trial of Bioreactor

Figure 2:
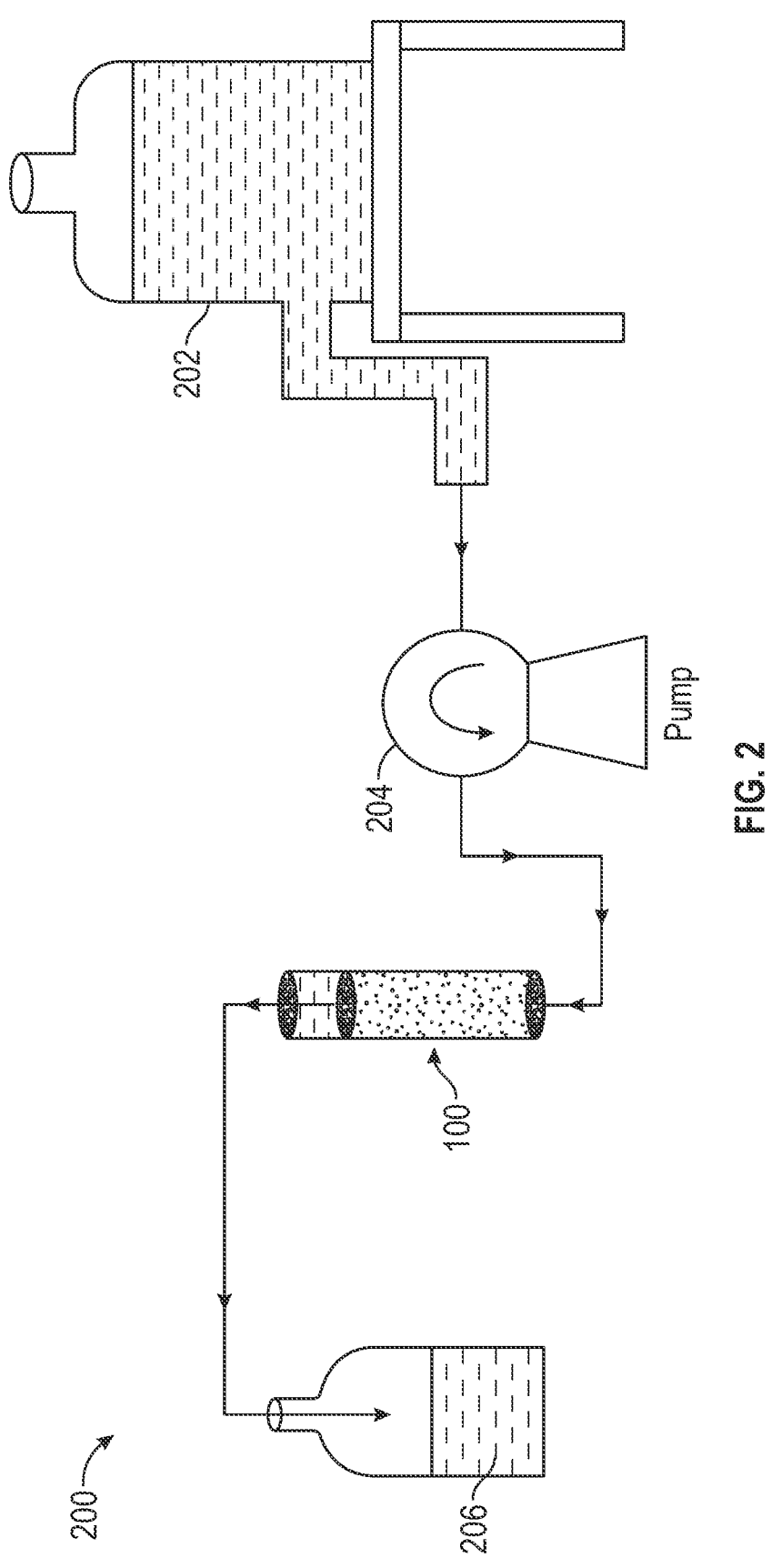
FIG. 2 depicts a bioreactor system in accordance with one or more embodiments of the present disclosure.

A bioreactor was constructed as described herein, and as illustrated in FIGS. 1-2, and charged with influent corresponding to groundwater. FIG. 2 depicts a bioreactor system 200 including an influent source 202, a pump 204, a bioreactor 100, and an effluent 206. The concentration of 1,4-dioxane in the influent was approximately 25 µg/L. The concentration of 1,4-dioxane in the treated water was measured to be less than 0.5 µg/L, which represents the detection limit of the measuring equipment available.

Example 2: Comparison of Adsorbents

Figure 3:
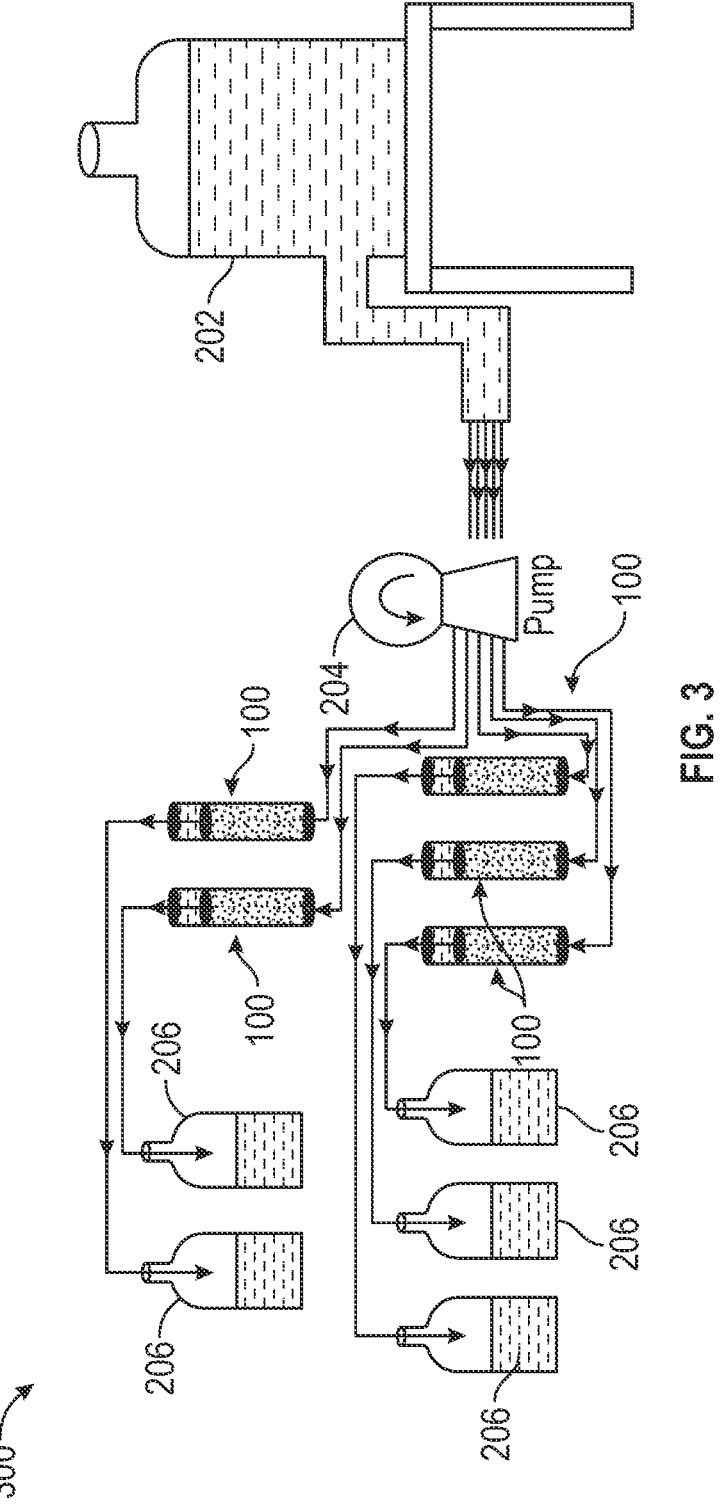
FIG. 3 depicts a bioreactor system in accordance with one or more embodiments of the present disclosure.

Bioreactors were constructed as described herein, and as illustrated in FIGS. 1-3. FIG. 3 depicts a bioreactor system 300 including an influent source vessel 202 configured to deliver influent to each of the five bioreactors 100. A pump 204 was used to drive the influent to/through the bioreactors. Each bioreactor 100 had an effluent collection vessel 206. Each bioreactor included a column charged with a different adsorbent. The adsorbents used are listed in Table 1 along with the height of the absorbent in the column and the weight of adsorbent used. As described above, the surface area of the adsorbent is determinative of the adsorbent's effectiveness. Thus, Table 1 also details the specific surface area of each adsorbent.

TABLE 1

| Adsorbents tested | | | |
|---|---|---|---|
| Adsorbent Type | Specific surface Area (m²/g) | Height in column (mm) | Weight in column (g) |
| Ambersorb ™ 560 | ~450 | 45 | 10.8 |
| Zeolite HSZ - Alumina | 310~340 | 45 | 11.9 |
| Zeolite HSZ - Clay | ~310 | 45 | 12.0 |
| Granular Activated Carbon (GAC) | ~600 | 45 | 8.9 |
| HiSiv 3000 | ~300 | 45 | 12.3 |

Each of the AmberSorb™ 560, HiSiv 3000, Zeolite HSZ-Alumina, and Zeolite HSZ-Clay were acquired from Geosyntec Consultants, Boca Raton, Florida, USA. All adsorbents were washed with deionized water before being loaded into the reactor.

Each reactor was operated in an up-flow mode, with influent passing upwards through the reactor. Each reactor included a screen above the adsorbent to prevent adsorbents from being carried out of the reactors by the water flow. The screen happened to also retain any biomass that detached from the surface of the adsorbents. The accumulated detached biomass caught by the screen unexpectedly helped to remove additional 1,4-dioxane.

Each reactor was tested under four different empty bed contact times (EBCT) and four different influent flow rates; the different operating conditions are referred to as Phase 1, 2, 3 and 4. Each bioreactor was operated for 1,4-dioxane removal with an influent concentration of 25 µg/L and an EBCT of 1.5 hours for Phase 1, 3 hours for Phase 2, 0.75 hours for Phase 3, and 1.5 hours for Phase 4. The influent was charged into the adsorbent column using a pump configured to operate at a flow rate of 0.2 mL/min for Phase 1, 0.1 mL/min for Phase 2, 0.4 mL/min for Phase 3, and 0.2 mL/min for Phase 4.

Two abiotic columns (Ambersorb™ 560 and GAC) were used as controls and were introduced during Phase 4.

The influent for the experiment was a simulated contaminated water prepared by adding a 1,4-dioxane stock solution (100 mg/L) to a nitrate mineral medium.

As the source of inoculation, biomass from previous kinetics experiments in the lab was used. Biomass from the kinetic experiment was shaken and then transferred to centrifuge tubes, which were centrifuged for 10 minutes. The supernatant was removed, and nitrate mineral medium was added to wash the pellet without resuspending cells. This process was repeated to further wash the biomass. Then the pellet was resuspended in 60 mL of nitrate mineral medium. Duplicate 1.5 mL samples of the mixed biomass were collected and stored at a −20° C. refrigerator. Afterwards, the five bioreactors were inoculated by adding 10 mL biomass to each reactor and mixing the biomass with the absorbents. The reactors stood for 24 hours and then were continuously fed with the nitrate mineral medium that contained 1,4-dioxane at 25 µg/L. All the reactors were covered with aluminum foil to prevent algae growth.

Samples were taken every one or two weeks from the influent bottle and the five biotic effluent bottles (one effluent bottle for each bioreactor/each adsorbent). Each sample was filtered with a 0.45 µm filter immediately following sampling. The 1,4-dioxane measurement was carried out using Gas Chromatography-Mass Spectrometry (GC-MS) combined with solid phase microextraction (SPME). Biomass samples were taken from all reactors when reactors reached steady state at stages 2 and 3. DNA was extracted from eleven samples, including the inoculum, five reactors in stage 2, and five reactors in stage 3.

Figure 4:
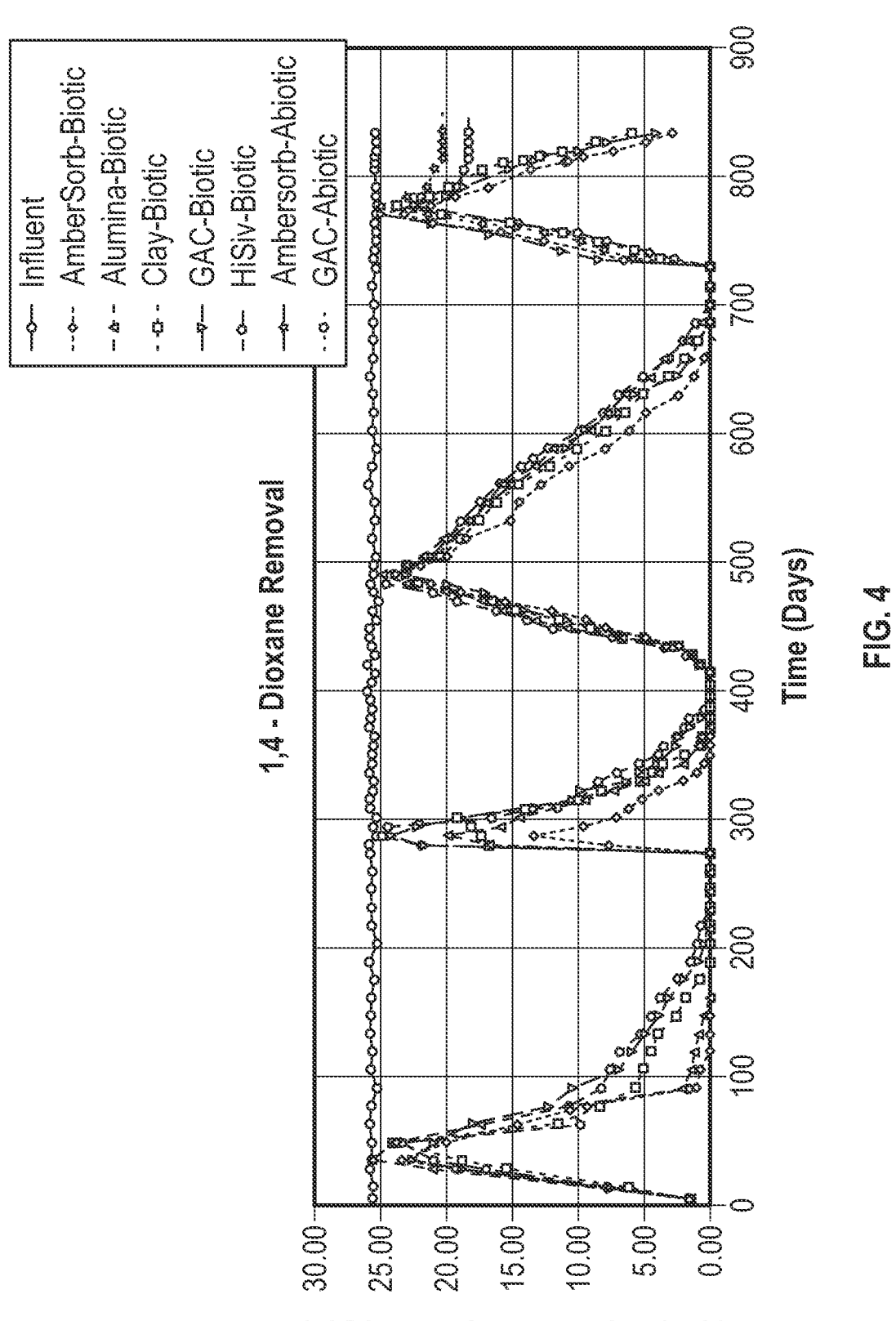
FIG. 4 depicts experimental results of 1,4-dioxane removal in seven different reactors.

The results of the 1,4-dioxane removal for each reactor is depicted in FIG. 4. All five bioreactors successfully removed 1,4-dioxane to below the detection limit in the first three phases. In each Phase, the Ambersorb™ 560 was the most effective. This represented the first biological reactors to metabolically remove 1,4-dioxane to below the detection limit of 0.5 µg/L, which is close to the health-based reference level of 0.35 µg/L, when operated at a continuous flow mode and a steady state.

As shown in FIG. 4, each of the abiotic columns, introduced in Phase 4, quickly reached a steady state in Phase 4 and were unable to remove any additional 1,4-dioxane. This was expected because the abiotic columns did not include microbial inoculum, so the 1,4-dioxane removal capabilities were limited.

Figure 5:
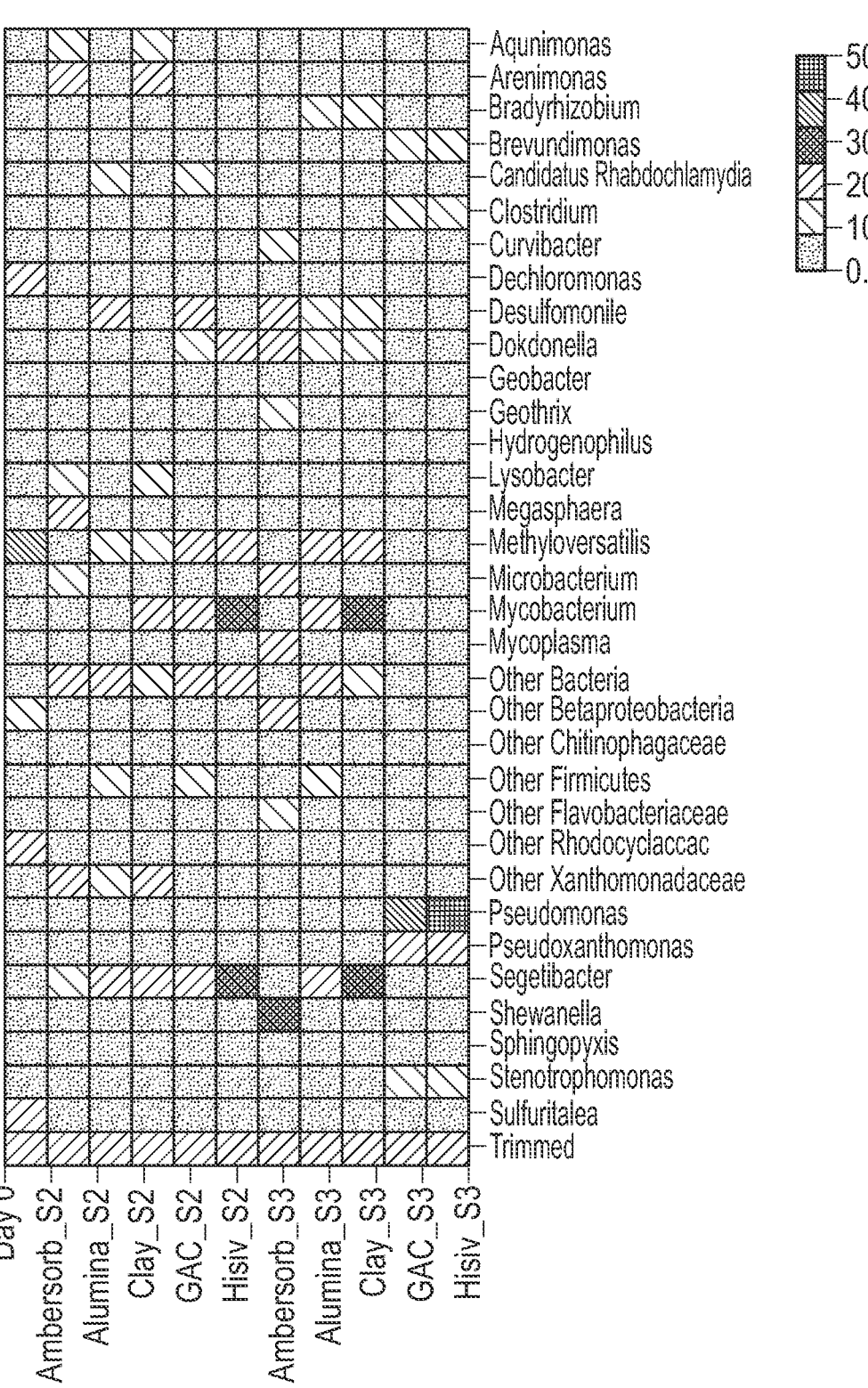
FIG. 5 depicts experimental results of 1,4-dioxane removal in five different bioreactors.

FIG. 5 depicts the relative abundance of microbial groups in microbial communities in the five columns at Day 0 (in the influent), Phase 2 steady state ("S2"), and Phase 3 steady state ("S3"). The abundances of *Methyloversatilis*, Other *Rhodocyclaceae, Dechloromonas*, and *Sulfuritalea* significantly decreased from the inoculum to Phases 2 and 3. On the other hand, most of the other groups in FIG. 5 were enriched in at least one of the columns for at least one of the two phases. Among them, *Dokdonella* and *Mycobacterium* are well-known as 1,4-dioxane degraders. The abundances of these 1,4-dioxane degraders depended on the phase and adsorbent type: e.g., the relative abundance of *Mycobacterium* in steady state 2 was 2.7% for Alumina, 8.8% for Clay, 7.6% for GAC, 16.6% for Hisiv, and the lowest for Amber-Sorb™ 560.

The first key factor in the success of the bioreactors is the operating condition that combines low influent 1,4-dioxane concentration (~25 µg/L) and a medium empty bed contact time (EBCT=0.75-3.0 hours). The combined condition helped the reactors to selectively enrich 1,4-dioxane-metabolizing microbes that are able to degrade 1,4-dioxane to below the health-based reference level. The 1,4-dioxane concentration that was used in the influent (~25 µg/L) is environmentally relevant; the 1,4-dioxane concentrations in the vast majority of groundwater are less than tens of µg/L.

A medium EBCT is also critical to the success of the reactors. While a too large EBCT leads to inadequate substrate (food) for microbial growth, a too small EBCT leads to high 1,4-dioxane concentration in the reactor and the reactor effluent.

The second key factor in the bioreactor success was the screen above the adsorbent in each reactor.

The reactors described herein can be directly used to treat drinking water sources that are contaminated by 1,4-dioxane. The reactors can also be used to enrich microorganisms that can metabolize 1,4-dioxane at environmentally relevant concentrations. The enriched microorganisms can then be injected through bioaugmentation into groundwater for in-situ bioremediation of sites contaminated by 1,4-dioxane.

While the disclosure has been described with reference to a number of embodiments, it will be understood by those skilled in the art that the disclosure is not limited to such embodiments. Rather, the disclosure can be modified to incorporate any number of variations, alterations, substitutions, or equivalent arrangements not described herein, but which are commensurate with the spirt and scope of the disclosure. Conditional language used herein, such as "can," "could," "might," or "may," unless specifically stated otherwise, or otherwise understood within the context as used, generally is intended to convey that certain embodiments include, while other embodiments do not include, certain features, elements or functional capabilities. Additionally, while various embodiments of the disclosure have been described, it is to be understood that aspects of the disclosure may include only some of the described embodiments. Accordingly, the disclosure it not to be seen as limited by the foregoing described, but is only limited by the scope of the appended claims.

That which is claimed is:

1. A method of reducing 1,4-dioxane content in water, the method comprising:

providing a bioreactor system comprising:

a housing having an inlet and an outlet;

at least one adsorbent layer which (i) comprises a biofilm comprising microbial inoculum capable of metabolizing 1,4-dioxane, and (ii) is contained with the housing; and a first screen positioned downstream from the at least one adsorbent layer, wherein the first screen has a plurality of openings having a largest dimension of about 0.001 mm, wherein the first screen is configured to retain within the bioreactor system any of the biofilm and microbial inoculum that becomes detached from the at least one adsorbent layer, and wherein the housing is configured to receive through the inlet a flow of an influent comprising water contaminated with 1,4-dioxane and the bioreactor is configured to be operated in a manner effective to discharge an effluent from the outlet, which effluent comprises water contaminated with 1,4-dioxane in an amount of less than 0.5 µg/L;

enriching, via the influent, the biofilm within the bioreactor system, which biofilm comprises 1,4-dioxane-metabolizing microbial inoculum;

removing the biofilm from the bioreactor system; and then injecting the biofilm into a contaminated site, wherein injecting the biofilm into the contaminated site results in in-situ remediation of the contaminated site through bioaugmentation.

2. The method of claim 1, wherein the bioreactor system further comprises a second screen positioned upstream from the at least one adsorbent layer.

3. The method of claim 1, wherein the at least one adsorbent layer comprises a bed of adsorbent particles.

4. The method of claim 1, wherein the bioreactor system is configured to be operated in an up-flow mode.

5. The method of claim 1, wherein the bioreactor system is configured to be operated in a down-flow mode.

6. The method of claim 1, wherein the bioreactor system further comprises a pump in fluid communication with the inlet.

7. The method of claim 1, wherein the bioreactor system is configured to be operated to produce an empty bed contact time from about 30 minutes to about 720 minutes.

8. The method of claim 1, further comprising:

flowing water from a water source as an influent into the inlet of the housing, wherein the influent has a first concentration of 1,4-dioxane; and collecting treated water discharged as an effluent from the outlet, wherein the effluent has a second concentration of 1,4-dioxane.

9. The method of claim 8, wherein the first concentration of 1,4-dioxane is less than 25 μg/L.

10. The method of claim 8, wherein the first concentration of 1,4-dioxane is between 0.5 μg/L and 25 μg/L.

11. The method of claim 8, wherein the first concentration of 1,4-dioxane is about 25 μg/L.

12. The method of claim 11, wherein the bioreactor system is operated to produce an empty bed contact time from about 30 minutes to about 720 minutes.

13. The method of claim 8, wherein the second concentration of 1,4-dioxane is less than 0.5 μg/L.

14. The method of claim 8, wherein the first concentration of 1,4-dioxane is about 25 μg/L and the second concentration of 1,4-dioxane is less than 0.5 g/L.

15. The method of claim 8, wherein the bioreactor system is operated to produce an empty bed contact time from about 30 minutes to about 720 minutes.

16. The method of claim 8, wherein the at least one adsorbent layer of the bioreactor system comprises a bed of adsorbent particles.

17. The method of claim 16, wherein the adsorbent particles comprise a carbonaceous adsorbent, an inorganic silicone-aluminum oxide adsorbent, and/or a high-silica zeolite adsorbent.

18. The method of claim 8, wherein the bioreactor system is operated at conditions to selectively enrich 1,4-dioxane-metabolizing microbes that are able to degrade 1,4-dioxane to less than 0.5 μg/L.

* * * * *